United States Patent Office 3,542,905
Patented Nov. 24, 1970

3,542,905
PROCESS FOR PREPARING HEAT RESISTANT
GRAFT COPOLYMERS
Akinori Nishioka, Yokkaichi-shi, Junya Ito, Inabe-gun,
Susumu Horiuchi, Suzuka-shi, and Setsuo Miyazono
and Sukeji Higuchi, Yokkaichi-shi, Japan, assignors to
Japan Synthetic Rubber Co., Ltd., Tokyo, Japan, a corporation of Japan
No Drawing. Filed Aug. 7, 1968, Ser. No. 750,782
Claims priority, application Japan, Aug. 11, 1967,
42/51,250
Int. Cl. C08f 15/00
U.S. Cl. 260—879    10 Claims

ABSTRACT OF THE DISCLOSURE

Heat resistant graft copolymers are prepared by graft copolymerizing a rubber-like polymer in latex state with a vinyl monomer mixture essentially containing α-methylstyrene in two steps, the first step being effected in the presence of an organic peroxide initiator and the second step in the presence of a persulfate initiator. The heat resistant graft copolymers thus obtained are also excellent in processability, mechanical strength and surface gloss.

---

This invention relates to a process for preparing excellent heat resistant graft copolymers.

It is known that thermoplastic resins formed by the graft copolymerization of a rubber-like polymer such as polybutadiene rubber, styrene-butadiene rubber (SBR), acrylonitrile-butadiene rubber (NBR) and the like with styrene or a mixture of styrene and acrylonitrile, which are called high impact polystyrene or ABS resin, respectively, have excellent processability and high impact strength, and are preferably used for injection molding. However, these thermoplastic resins have disadvantageously low heat distortion temperature (lower than 90° C. according to the test of ASTM D-648-56) and low heat resistant properties such as high heat shrinkage. Therefore, the graft copolymerized thermoplastic resins are not applicable in a field where high heat resistance is required, for example, car parts. It has ben proposed to use α-methylstyrene in place of styrene in order to improve the heat resistant property of such thermoplastic resins as mentioned above. For example, Japanese patent publication No. 697/67 discloses that the copolymerization of α-methylstyrene with methyl methacrylate in the presence of an elastomer results in the formation of thermoplastic resin having a heat distortion temperature of 97–116.5° C. Further, U.S. Pat. No. 2,908,661 discloses a resin having a heat distortion temperature of at least 98° C. obtained by graft copolymerizing polybutadiene, α-methylstyrene and acrylonitrile. These resins have an improved heat resistant property, but inferior in such properties as processability, mechanical strength and surface gloss.

Now the inventors have found that thermoplastic resins having high heat resistant property and well balanced overall properties such as processability, mechanical strength, surface gloss and the like, are obtained by graft copolymerization of a mixture of vinyl monomers including α-methylstyrene onto a rubber-like polymer in a latex state in which a part of the monomer mixture is first graft-copolymerized by using an oil-soluble organic peroxide as initiator and then the remaining monomers are graft-copolymerized by using a water-soluble persulfate as initiator.

According to this invention, heat resistant graft copolymers are prepared by graft copolymerizing 5–30 parts by weight of a rubber-like polymer in a latex state with 70–95 parts by weight of a mixture of vinyl monomers including α-methylstyrene of 10–75% by weight in which the mixture of vinyl monomers of 25–75% by weight on the basis of the total amount of the monomers, the mixture containing α-methylstyrene of 0–6% by weight on the basis of the amount of said mixture of 25–75% by weight on the basis of the total amount of the monomer mixture, is first graft-copolymerized in the presence of an organic peroxide initiator and then the remaining vinyl monomers mixture is graft-copolymerized in the presence of a persulfate initiator.

According to this invention, there are obtained thermoplastic resins which have high heat distortion temperature, low heat shrinkage excellent processability, mechanical strength and surface gloss.

The rubber-like materials employed in this invention are preferably butadiene series rubber-like polymers such as polybutadiene, styrene-butadiene rubber (SBR), acrylonitrilebutadiene rubber (NBR). Particularly, polybutadiene and SBR are preferable. Further, a mixture of rubber-like materials may be used and a mixture of polybutadiene and SBR is preferred. In addition, butadiene series rubber-like polymers containing carboxyl groups such as those copolymerized with a small amount of maleic acid, acrylic acid, itaconic acid and the like, may be preferably employed.

The vinyl monomer component employed in this invention is a mixture essentially including α-methylstyrene and, in addition, aromatic vinyl compounds and/or vinyl cyanides. The vinyl monomer component may contain ethylenic unsaturated compounds copolymerizable with the vinyl compounds as mentioned above. Among aromatic vinyl compounds, styrene and vinyl toluene are preferably, and particularly, styrene is preferred. Among vinyl cyanides, acrylonitrile and methacrylonitrile are preferable and the former is particularly preferred. As the ethylenic unsaturated compounds, methacrylic acid and the heat distortion temperature are markedly lowered. is particularly preferred. Preferable examples of the combination of the monomers to be copolymerized are shown below:

α-methylstyrene-styrene,
α-methylstyrene-acrylonitrile,
α-methylstyrene-styrene-acrylonitrile,
α-methylstyrene-styrene-acrylonitrile-methylmethacrylate.

The latter two combinations are particularly preferred.

The ratio of amount (weight) of the rubber-like polymer to that of the vinyl monomer to be copolymerized therewith should be the range of from 5/95–30/70. When the ratio is lower than 5/95, the impact strength is lowered. When the ratio is higher than 30/70, the hardness and te heat distortion temperature are markedly lowered.

In order to obtain the resin in which overall properties such as heat resistance, processability, mechanical strength, surface gloss and the like are well balanced in effect, the amount of α-methylstyrene should be 10–75% by weight based on the total amount of the monomer mixture to be graft-copolymerized. The amount of vinyl cyanides is preferably less than 40% by weight based on total amount of the monomer mixture, and the ethylenic unsaturated compounds are preferably in an amount of less than 70% by weight of the monomer mixture. The monomer mixtures are divided into two groups and copolymerized in two steps. The amount of monomers used in the first step should be 25–75% by weight, prefererd with 35–55% by weight, based on the total amount of the monomer mixture and also the amount of α-methylstyrene should be less than 60% by weight based on the total amount of the monomers used in the first step. In the first step, α-methylstyrene may not be included. However, it is necessary that α-methylstyrene is present in the second step polymerization.

The most important feature of this invention resides in that the first step of graft copolymerization is carried out in the presence of an organic peroxide initiator and the second step of graft copolymerization in the presence of a persulfate initiator. If the graft copolymerization is effected by using only an organic peroxide or a persulfate, or the first step is conducted in the presence of a persulfate initiator and the second step in the presence of an organic peroxide initiator, any resin having such balanced properties as in the invention is not produced.

As initiators, organic peroxides and persulfates are known to those skilled in the art. Among organic peroxides, peroxides such as benzoylperoxide and the like, and hydroperoxides such as cumenehydroperoxide, diisopropylbenzene hydroperoxide, paramenthane hydroperoxide and the like, are preferred. Particularly, redox formulations known as a sugar-containing pyrophosphate formulation, a nonsugar pyrophosphate formulation, a peroxamine formulation, a sulfoxylate formulation etc. containing a hydroperoxide, are preferable. As persulfates, potassium persulfate and ammonium persulfate are particularly preferred.

Graft-copolymerization process itself is well known to those skilled in the art. The vinyl monomers graft-copolymerized in two steps may be added in each step at once or added continually as the reaction proceeds.

The following examples are given as illustrative of the invention, but it will be understood that the invention is not limited thereto. In the examples, parts and percents are by weight unless otherwise specified.

EXAMPLE 1

To 15 parts (as total solids weight) of polybutadiene latex, there were added 5 parts of styrene, 24.5 parts of α-methylstyrene, 13 parts of acrylonitrile, 0.1 part of tertiary dodecylmercaptan, 1.0 part of potassium disproportionated rosinate and 150 parts of water. Further, an initiator system comprising 0.42 part of cumene hydroperoxide, 0.7 part of dextrose, 0.5 part of sodium pyrophosphate and 0.01 part of ferrous sulfate was added to the resulting mixture, and the polymerization was carried out stirring the mixture at 70° C. for two hours. The conversion was 96%. To the reaction mixture thus obtained, there were added 5 parts of styrene, 24.5 parts of α-methylstyrene, 13 parts of acrylonitrile, 1.0 part of potassium disproportionated rosinate, 0.3 part of tertiary dodecylmercaptan, 100 parts of water and 0.2 part of potassium persulfate at a time, and the resulting mixture was stirred at 60° C. for 3 hours, thus graft copolymer latex was obtained at 95% conversion. A two percent aqueous solution of sufuric acid was added to the latex to coagulate the polymer. The polymer was separated, washed with water, dehydrated, dried, mixed with a stabilizer, pelletized by an extruder, and molded by means of in-line screw type 3.5-ounce injection molding machine to form a bar of ¼" x ½" x 5" and a disc of 4" in diameter and ⅛" in thickness, which were then tested with respect to the physical properties. The results are shown in the table below, with the results of following reference examples.

Reference Example 1

The procedure of Example 1 was repeated except that the monomers in the first step of Example 1 were not added to polybutadiene latex, but only the same amount of the initiator was added, and the mixture was stirred at 70° C. for two hours, and then the monomers, the emulsifier, the modifier and water at the total amounts of those in the first step and the second step in Example 1 and 0.2 part of potassium persulfate were added thereto, followed by stirring at 60° for three hours. Thus, a graft copolymer was obtained at 95% conversion.

Reference Example 2

The procedure of Example 1 was repeated except that the ratio of amount of the monomers in the first step to that in the second step was 20:80; that is, 2.0 parts of styrene, 9.8 parts of α-methylstyrene and 5.2 parts of acrylonitrile were employed in the first step while 8.0 parts of styrene, 39.2 parts of α-methylstyrene and 20.8 parts of acrylonitrile were employed in the second step. Thus, a graft copolymer was obtained at 95% conversion.

Reference Example 3

The procedure of Example 1 was repeated except that the ratio of amount of the monomers at the first step to that at the second step was 80:20, that is, 8.0 parts of styrene, 39.2 parts of α-methylstyrene and 20.8 parts of acrylonitrile were employed in the first step while 2.0 parts of styrene, 9.8 parts of α-methylstyrene and 5.2 parts of acrylonitrile. Thus, a graft copolymer was obtained at 96% conversion.

Reference Example 4

The procedure of Example 1 was repeated except that the total amounts of the monomers, the modifier, the emulsifier and water employed in the first and the second steps were added at a time and 0.4 part of potassium persulfate was added as an initiator followed by stirring at 70° C. for 3 hours. Thus, a graft copolymer was obtained at 95% conversion.

Reference Example 5

The procedure of Reference Example 4 was repeated except that the same amount of the initiator system as employed in the first step of Example 1 was used in place of potassium persulfate. Thus, a graft copolymer was obtained at 96% conversion.

Reference Example 6

The procedure of Example 1 was repeated except that in the second step the same sugar-containing pyrophosphate formulation as in the first step was employed in the same amount in place of potassium persulfate. The conversion was 95%.

Reference Example 7

The procedure of Example 1 was repeated except that in the first step 0.4 part of potassium persulfate was employed as the initiator in place of the sugar-containing pyrophosphate formulation. The conversion was 95%.

TABLE

| | Flow rate [1] ×10³ (cm.³/sec.) | Izod impact strength (kg.-cm./cm.²) | Rockwell hardness (R scale) | Heat [2] distortion temperature (° C.) | Surface [3] gloss (percent) | Heat [4] shrinkage (percent) |
|---|---|---|---|---|---|---|
| ASTM | | D 256 | D 785 | D 648 | D 673 | |
| Example 1 | 2.5 | 27.8 | 108 | 97 | 70 | 0.6 |
| Reference Example: | | | | | | |
| 1 | 2.7 | 9.0 | 106 | 97 | 17 | 0.4 |
| 2 | 1.0 | 26.3 | 108 | 96 | 9.4 | 1.5 |
| 3 | 1.3 | 27.1 | 108 | 96 | 23 | 1.5 |
| 4 | 0.3 | 6.2 | 103 | 88 | 10 | 6.0 |
| 5 | 0.8 | 8.5 | 100 | 89 | 15 | 7.5 |
| 6 | 2.0 | 9.3 | 106 | 87 | 30 | 4.0 |
| 7 | 1.4 | 10.5 | 108 | 99 | 20 | 0.4 |

[1] Flow rate: The volume of resin flowing out through a nozzle of 1 mm. in diameter and 2 mm. long for one second at 200° C. under a load of 30 kg. in Koka-type Flow Tester.
[2] Heat distortion temperature: ½″ × ¼″ × 5″ bar, load 264 p.s.i., without anneal.
[3] Surface gloss: This is shown by the percentage of light reflected to light incident upon a mirror at an angle of 45° by means of Murakami type gloss meter. When the value is higher than 50%, a gloss is felt by eye.
[4] Heat shrinkage: The degree of shrinkage in a direction of flow caused when a disc of 4″ in diameter and ⅛″ thick is allowed to stand in a Geer's oven at 110° C. for one hour.

The above table shows that the heat resistant resin obtained by the present invention possesses excellent processability, high mechanical strength, and excellent surface gloss.

Example 2

The procedure of Example 1 was repeated except that the amount of α-methylstyrene was 19 parts in the first step and 30 parts in the second step. A graft copolymer was obtained at 96% conversion.

Physical properties of the graft copolymer thus obtained are shown below:

Flow rate: $1.2 \times 10^{-3}$ cm.³/sec.
Impact strength: 20 kg.-cm./cm.²
Heat distortion temperature: 98° C.
Heat shrinkage: 0.6%
Surface gloss: 75%

EXAMPLE 3

The procedure of Example 2 was repeated except that a sulfoxylate formulation comprising 0.40 part of diisopropylbenzene hydroperoxide, 0.022 part of ferrous sulfate, 0.067 part of sodium ethylenediamine tetraacetate, and 0.089 part of sodium formaldehyde sulfoxylate was used in the first step in place of the sugar-containing pyrophosphate formulation. The conversion was 94%.

Physical properties of the resulting resin are given below:

Flow rate: $1.1 \times 10^{-3}$ cm.³/sec.
Impact strength: 23 kg.-cm./cm.²
Heat distortion temperature: 97° C.
Heat shrinkage: 0.7%.
Surface gloss: 72%.

EXAMPLE 4

The procedure of Example 2 was repeated, but after the completion of the first step reaction the whole amount of potassium persulfate was added to the resulting reaction mixture and then the monomers, the modifier and an emulsion obtained by emulsifying water with potassium disproportionated rosinate were continuously added dropwise over two hours, followed by the reaction for further one hour. A graft-copolymer was obtained at 96% conversion.

Physical properties of the resulting product are shown below:

Flow rate: $1.2 \times 10^{-3}$ cm.³/sec.
Impact strength: 20 kg.-cm./cm.²
Heat distortion temperature: 98° C.
Heat shrinkage: 0.4%

Example 5

To 15 parts (as solid matter) of polybutadiene latex, there were added 5 parts of styrene, 7.5 parts of acrylonitrile, 22 parts of methyl methacrylate, 0.1 part of tertiary dodecyl mercaptan, 1.0 part of potassium disproportionated rosinate and 150 parts of water. And then an initiator comprising 0.42 part of cumene hydroperoxide, 0.7 part of dextrose, 0.5 part of sodium pyrophosphate and 0.01 part of ferrous sulfate was added thereto. The reaction was carried out stirring for two hours at 70° C. and the product was obtained at 93% conversion. Further, to the resulting first step system, there were added 6 parts of styrene, 37 parts of α-methylstyrene, 7.5 parts of acrylonitrile, 0.3 part of tertiary dodecylmercaptan, 1.0 part of potassium disproportionated rosinate and 0.2 part of potassium persulfate. The reaction was carried out at 60° C. for 7 hours to give the product at 94% conversion.

Physical properties of the resulting resin are given below:

Flow rate: $2.3 \times 10^{-3}$ cm.³/sec.
Impact strength: 15 kg.-cm./cm.².
Heat distortion temperature: 93° C.
Heat shrinkage. 0.2%.

What is claimed is:

1. A process for preparing a heat resistant graft copolymer which comprises graft copolymerizing in two steps 5-30 parts by weight of a rubber-like polymer in latex state with 70-95 parts by weight of a mixture of vinyl monomers containing α-methylstyrene of 10-75% by weight based on that total amount of the vinylmonomer mixture, the first step of said graft-copolymerization being carried out with vinyl monomers of 25-75% by weight based on the total amount of said vinyl monomer mixture in the presence of an organic peroxide initiator, the vinyl monomers containing α-methylstyrene of 0-60% by weight based on the total amount of the vinyl monomers used in the first step, and the second step of graft copolymerization being carried out with the remaining vinyl monomer mixture in the presence of a persulfate initiator.

2. A process for preparing a heat resistant graft copolymer according to claim 1 in which the rubber-like polymer is a butadiene series rubber-like polymer.

3. A process for preparing a heat resistant graft copolymer according to claim 1 in which the vinyl monomers except α-methylstyrene is at least one compound selected from the group consisting of aromatic vinyl compounds and vinyl cyanides.

4. A process for preparing a heat resistant graft copolymer according to claim 1 in which the organic peroxide is selected from the group consisting of benzoylperoxide, cumene hydroperoxide, diispropylbenzent hydroperoxide, and para menthane hydroperoxide.

5. A process for preparing a heat resistant graft copolymer according to claim 1 in which the persulfate is selected from the group consisting of potassium persulfate and ammonium persulfate.

6. A process for preparing a heat resistant graft copolymer according to claim 1 in which the mixture of vinyl monomers is selected from the group consisting of α-methylstyrene-styrene, α-methylstyrene-acrylonitrile, and α-methylstyrene-styrene-acrylonitrile.

7. A process for preparing a heat resistant graft copolymer according to claim 2 in which the butadiene series rubber-like polymer is selected from the group consisting of polybutadiene, styrene-butadiene rubber, and acrylonitrile-butadiene rubber.

8. A process for preparing a heat resistant graft copolymer which comprises graft-copolymerizing a two steps 5-30 parts by weight of a rubber-like polymer in latex state with 70-95 parts by weight of a mixture of vinyl monomers containing α-methylstyrene of 10-75% by weight based on the total amount of the vinyl monomer mixture, the mixture of vinyl monomers containing further an ethylenic unsaturated compound, the first step of said graft-copolymerization being carried out with vinyl monomers of 25-75% by weight based on the total amount of said vinyl monomer mixture in the presence of an organic peroxide initiator, the vinyl monomers containing α-methylstyrene of 0-60% by weight based on the total amount of the vinyl monomers used in the first step, and the second step of graft-copolymerization being carried out with the remaining vinyl monomer mixture in the presence of a persulfate initiator.

9. A process for preparing a heat resistant graft copolymer according to claim 8 in which the ethylenic unsaturated compound is methyl methacrylate.

10. A process for preparing a heat resistant graft copolymer according to claim 8 in which the mixture of vinyl monomers containing the ethylenic unsaturated compound is a mixture of α-methylstyrene, styrene and acrylonitrile and the ethylenic unsaturated compound is methyl methacrylate.

References Cited

UNITED STATES PATENTS

| | | | |
|---|---|---|---|
| 3,409,705 | 11/1968 | Shields et al. | 260—880 |
| 3,449,472 | 6/1969 | Coove et al. | 260—880 |
| 3,449,471 | 6/1969 | Weitzel et al. | 260—880 |

JOSEPH L. SCHOFER, Primary Examiner

R. A. GAITHER, Assistant Examiner

U.S. Cl. X.R.

260—880

UNITED STATES PATENT OFFICE
CERTIFICATE OF CORRECTION

Patent No. 3,542,905                Dated November 24, 1970

Inventor(s) AKINORI NISHIOKA et al.

It is certified that error appears in the above-identified patent and that said Letters Patent are hereby corrected as shown below:

In the specification, Column 2, line 52 should read

--and the esters are preferable and methyl methacrylate--

Signed and sealed this 15th day of June 1971.

(SEAL)
Attest:

EDWARD M. FLETCHER, JR.                WILLIAM E. SCHUYLER, JR
Attesting Officer                      Commissioner of Patents